Nov. 30, 1965 W. S. HENRION 3,221,260

FREQUENCY DISCRIMINATOR

Filed Dec. 1, 1960 3 Sheets-Sheet 1

INVENTOR.
W. S. Henrion
BY John E. Wagner
ATTORNEY

INVENTOR.
W. S. Henrion
BY John E. Wagner
ATTORNEY

Nov. 30, 1965 W. S. HENRION 3,221,260

FREQUENCY DISCRIMINATOR

Filed Dec. 1, 1960 3 Sheets-Sheet 3

INVENTOR.
W. S. Henrion

BY John E. Wagner

ATTORNEY 3,221,260
FREQUENCY DISCRIMINATOR

W. S. Henrion, Reseda, Calif., assignor to The Bendix Corporation, North Hollywood, Calif., a corporation of Delaware Filed Dec. 1, 1960, Ser. No. 73,080
2 Claims. (Cl. 329—123)

This invention relates to information-handling systems, and more particularly to frequency discriminators for FM telemetering systems.

In telemetering systems employing frequency modulation, a carrier wave of one channel or subchannel is frequency-modulated by a sensing element, such as an accelerometer or a thermocouple, in such a way as to produce a deviation from the center frequency of the carrier by an amount proportional to the particular condition sensed. After transmission over the system, it is necessary to detect the modulated signal, to determine the deviation of the carrier frequency, and to represent that deviation as indicative of the information content of the channel.

The recovery of information from FM telemetering systems has recently been accomplished employing phase-locked loop discriminators of the type described in the I.R.E. Transactions on Telemetry and Remote Control, vol. TRC–4, No. 1, June 1958, on page 20 in the paper, "Application of the Phase-locked Loop to Telemetry as a Discriminator or Tracking Filter," by C. E. Gilchriest.

Basically the phase-locked loop discriminator employs a phase comparator, a low-pass filter, a D.C. amplifier, and a voltage-controlled oscillator. Employing this discriminator, the incoming frequency-modulated wave is phase-compared with a locally generated signal from the voltage-controlled oscillator, and the filtered, amplified, D.C. component of the phase comparator output is applied to the oscillator to vary its frequency in accordance with the measured phase difference between the incoming and locally generated waves. In normal operation, with the local oscillator and incoming frequency in lock, the control voltage applied to the oscillator may be used directly as a measure of incoming frequency.

The phase-locked loop discriminator has the demonstrated advantage over conventional Foster-Seeley or pulse-counting discriminators of a lower detection threshold and, therefore, may be used to detect incoming signals arriving at a lower signal-to-noise ratio.

I have discovered that the same characteristics of the phase-locked loop discriminator may be obtained without the use of a separate phase comparator and oscillator. This discovery is predicted upon the application of the D.C. control voltage to a voltage-controlled oscillator, as in the phase-locked loop discriminator, and superimposing the incoming alternative signal upon the control voltage. Therefore, in accordance with this invention, a practical frequency discriminator is produced by a voltage-controlled oscillator having a single input circuit to which is applied the control voltage along with a low-pass filter connected to the output of the oscillator, a D.C. amplifier, and a feedback path from the amplifier to the oscillator input circuit. Employing this combination, the phase-comparison function is accomplished within the oscillator itself without any degradation of performance and with the resultant advantages, through the elimination of the separate phase comparator, of simplification and reduction in size and cost.

A full understanding of the invention may be had from the following detailed description and by reference to the drawing, in which:

FIG. 1 is a block diagram of a conventional phase-locked loop discriminator;

FIG. 1*a* is a block diagram of a phase-locked loop discriminator in accordance with this invention;

Figure 1:
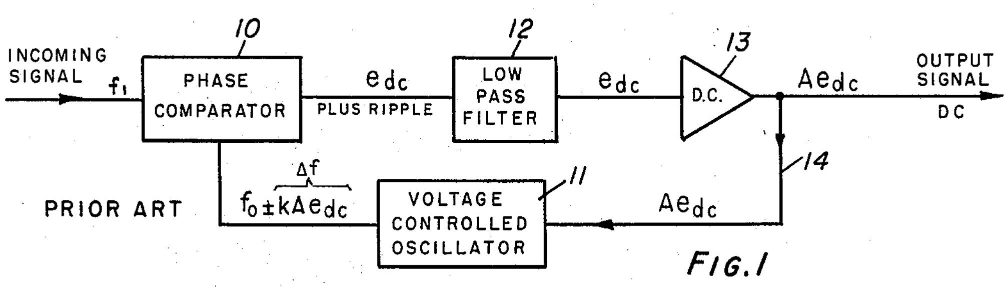

In FIG. 1 the phase-locked loop discriminator of the prior art includes a phase comparator 10 and a voltage-controlled oscillator 11 which operates at a center frequency $f_0$ in the absence of a control voltage input $Ae_{dc}$. The output of the oscillator 11 and the incoming signal $f_1$ are introduced into the phase comparator 10 so that the phases of the two waves are compared. The comparator 10 has an output voltage $e_{dc}$ proportional to the difference in phase of the incoming signal and the voltage-controlled oscillator. A filter 12 removes the ripple components from the phase comparator output $e_{dc}$, and the low frequency content is amplified in the D.C. amplifier 13 and fed back as a voltage $Ae_{dc}$ through lead 14 to the voltage-controlled oscillator 11. If the oscillator 11 and incoming signal differ in frequency, the phase relationship continually changes until the output of the phase comparator 10, when filtered and amplified, has changed enough to cause the oscillator 11 frequency to shift to the frequency $f_1$ of the incoming signal. If the incoming signal changes frequency, the resultant phase difference will change the frequency of the oscillator 11 until it is driven to the new frequency. By measuring tne voltage $Ae_{dc}$ at the control input lead 14 to the oscillator 11, the input signal frequency can be continuously determined.

Figure 1A:
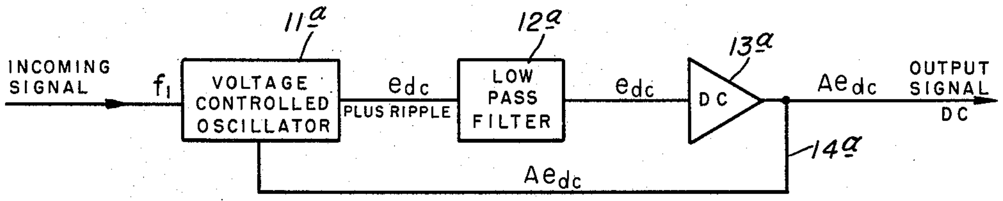

The basic form of discriminators in accordance with this invention appears in FIG. 1*a* and may be readily compared with the prior art discriminator of FIG. 1. The same component circuits, namely, voltage-controlled oscillators 11 and **11*a*, low-pass filters 12 and 12*a*, and D.C. amplifiers 13 and 13*a* appear in both discriminators. The phase comparator 10** of FIG. 1 is eliminated from the discriminator of FIG. 1*a* while its function is still performed.

*Discriminator circuit*

Figure 2:
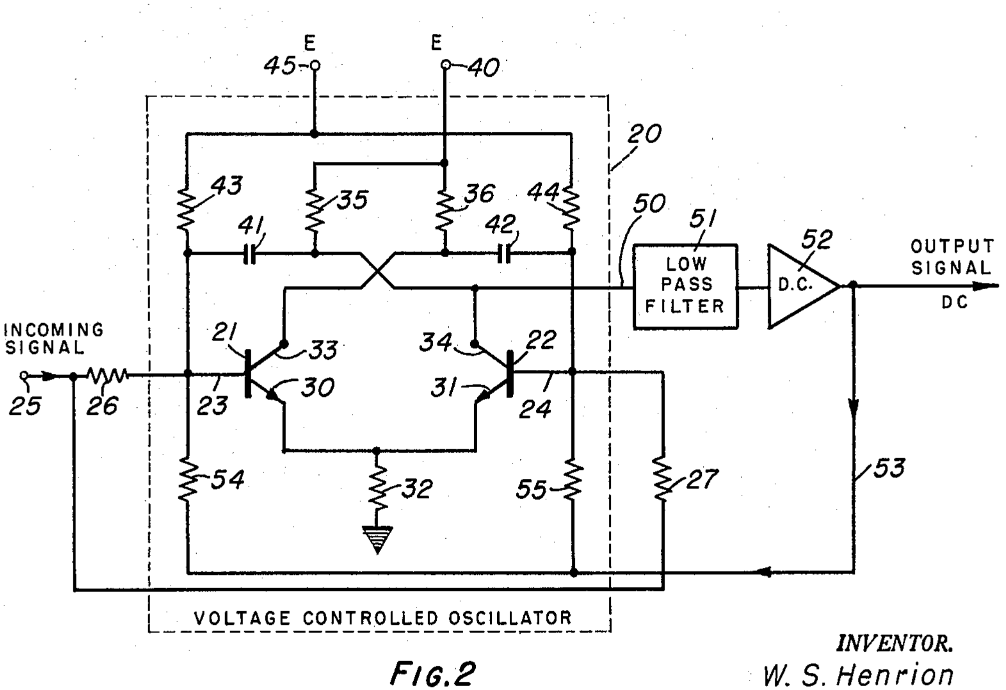
FIG. 2 is an electrical schematic of a frequency discriminator of this invention.

The frequency discriminator in accordance with this invention, as shown in FIG. 1*a* and in more detail in FIG. 2, comprises as a major component a voltage-controlled oscillator 20 (FIG. 2) in the form of an astable transistor multivibrator employing a pair of transistors 21 and 22 having respective base electrodes 23 and 24 constituting the signal input electrodes. The emitter electrodes 30 and 31 of transistors 21 and 22 are connected through a common resistor 32 to ground. The collector electrodes 33 and 34 of the respective transistors 21 and 22 are connected through individual resistors 35 and 36 to a common collector voltage supply 40, which may be in the order of 5 volts. The base electrode 23 of transistor 21 is coupled through a capacitor 41 to the collector electrode 34 of transistor 22. The base 24 of transistor 22 is similarly coupled through a capacitor 42 to the collector 33 of transistor 21 in conventional multivibrator practice. The base electrodes 23 and 24 are additionally connected through individual resistors 43 and 44 to a common base supply 45.

Incoming signals from terminal 25 are applied to an integrating network made up of resistor 26 and capacitor 41, while the same signal is applied through an integrating network made up of resistor 27 and capacitor 42 to the base electrode 24 of transistor 22. The normal charging circuit for the capacitor 41 in cludes the resistors 43, 54 and 26, while the charging circuit for capacitor 42 includes the resistors 44, 55 and 27. The resistors 43 and 44 are connected to a relatively high voltage, e.g. 30 volts, and therefore predominate in determining the normal rate of charge of the capacitors 41 and 42, and thus the normal frequency of the oscillator. Incoming signals which appear on terminal 25 modify the charging current to both the capacitors 41 and 42, and thereby vary the frequency of the oscillator.

The output of the multivibrator 20 is derived from the collector 34 of transistor 22 over lead 50. The lead 50 conducts the relatively square wave output to a low-pass filter 51 which removes the high-frequency component with the remainder of the energy introduced into a D.C. amplifier 52. The output of the D.C. amplifier 52, as will be shown, is a voltage proportional to the deviation of the oscillator frequency from its center frequency. This voltage level is a measure of the actual information content of the incoming wave which is applied to the voltage-controlled oscillator in a manner hereinafter described. The output of the amplifier 52 may therefore be introduced into a utilization circuit or displayed upon an indicator or suitable recording device. The voltage output of amplifier 52 is also fed back through conductor 53 and matched resistors 54 and 55, which changes the charging rates of capacitors 41 and 42.

Therefore, the charging circuits of the multivibrator capacitors 41 and 42 have a normal charging rate determined by the supply 45 and the resistors connected to the base electrodes 23 and 24. This charging rate is modified by the input through resistors 54 and 55 from the D.C. amplifier 52 and the signal input through respective resistors 26 and 27 from the information source.

*Phase-comparison operation*

Figure 3:
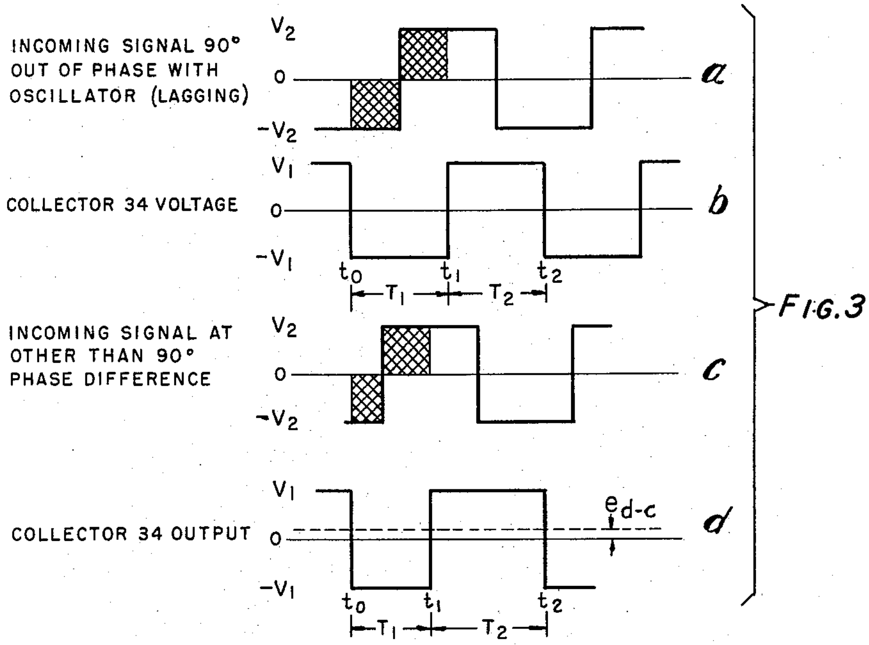
FIG. 3 is a graphical representation of idealized output and input waveforms for a discriminator of this invention under the conditions of phase-locked operation.

The operation of the discriminator of FIG. 2 may best be understood considering its operation *with the feedback loop open*, by reference to FIG. 3 showing the waveforms of the collector output of the oscillator 20 with a square wave of the center frequency applied to the integrating networks of the base circuits of the transistors 21 and 22. In curve 3*a*, the incoming signal is shown at the free running frequency of the voltage-controlled oscillator and 90° out of phase with the output wave curve 3*b* of the voltage-controlled oscillator. With the signal voltage 90° out of phase, the average signal voltage modulating the oscillator over each half cycle of oscillation, as indicated by the equal cross-hatched areas above and below the 0 line in period $T_1$, is seen to be zero. This results in no change in collector wave form; i.e., no frequency deviation by the oscillator.

It may be observed in curve 3*c* that the phase of the incoming signal has shifted from 90° with respect to curve 3*b* so that the average modulation voltage over each half cycle is no longer zero. In the case of curve 3*c*, where the modulating voltage is at a phase difference other than 90° from the oscillator phase, the period of a full cycle of the output waves ($T_1+T_2$) is equal to that of the unmodulated output wave, and no frequency deviation occurs when the multivibrator is frequency-modulated at its center frequency. The lengths of adjacent half cycles of the output waves of FIG. 3*d*, however, are unequal. In FIG. 3*d*, the positive half cycle $T_2$ of the collector voltage may be seen as of greater duration than the negative half cycle $T_1$. The integrated voltage, therefore, over a full cycle includes a positive direct current component, and this component is a function of the phase difference.

It is possible to determine the phase relationship between the modulating (signal) wave and the oscillator unmodulated wave by determining the level of the D.C. component of the output waveform. This is done by employing the low-pass filter 51 and D.C. amplifier 52 of FIG. 2. The discriminator so described, with the feedback loop open, actually functions as a phase comparator.

The D.C. component of the output of the oscillator 20 may be applied as the control input to maintain its frequency at that of the incoming signal to convert the phase discriminator into a phase-locked loop discriminator. When so connected, a closed loop system is produced in which the oscillator frequency is shifted to the incoming signal frequency by the D.C. voltage. A phase relationship is established between the incoming signal and the voltage-controlled oscillator so as to maintain the required D.C. voltage. With a change in incoming signal frequency, the phase relationship changes, resulting in a new D.C. voltage level which in turn shifts the oscillator frequency to the new signal frequency. The output of the D.C. amplifier constitutes a voltage varying directly with the deviation of the incoming frequency from the center frequency of the multivibrator.

*Phase-locked loop operation*

Figure 4:
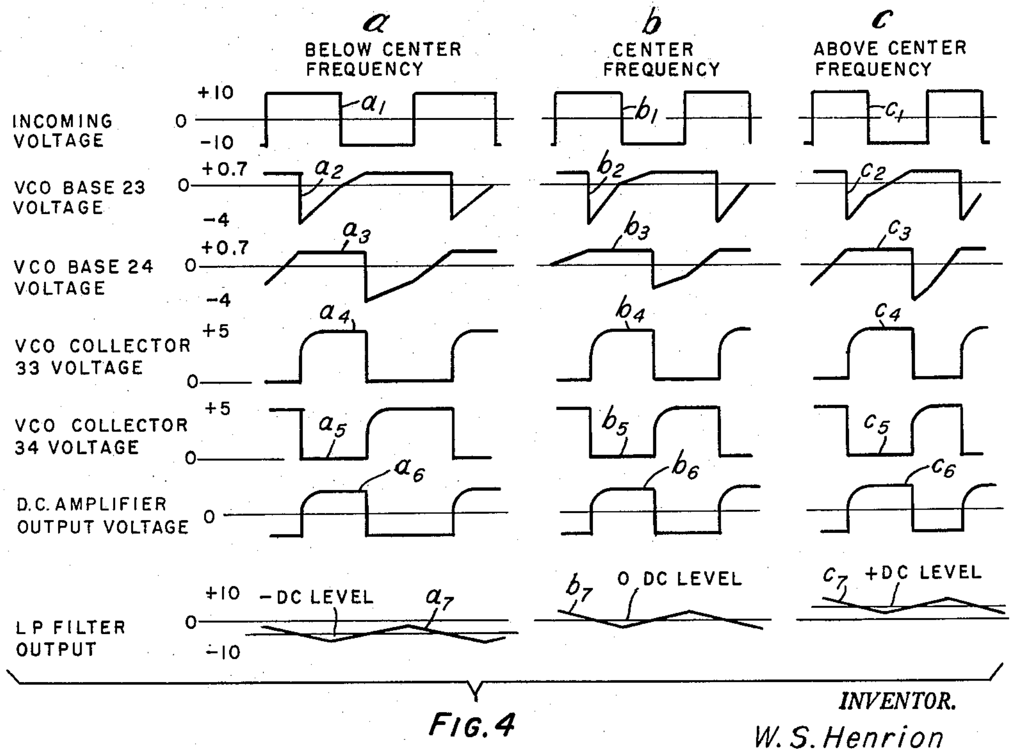
FIG. 4 is a graphical representation of the waveforms produced by the discriminator of FIG. 2 under different operating conditions.

Referring now to FIG. 4 in conjunction with FIG. 2, particularly FIG. 4*b* which shows the incoming signal at the free-running or center frequency of the multivibrator, the incoming signal, amplified and limited, appears as a symmetrical square wave $b_1$. The base 23 of transistor 21 is initially at a slightly positive bias, as shown in wave $b_2$, the transistor 21 is conducting. This condition remains during the first positive half cycle of the incoming voltage until the voltage on the base 24 (curve $b_3$) of transistor 22 following the rising charge on capacitor 42 reaches the conduction level, in this case 0.7 volts, and conduction is transferred from transistor 21 to transistor 22 with transistor 21 being cut off, causing the negative excursion of the base 23 voltage (curve $b_2$). During the conduction of transistor 22, the voltage at base 23 rises along the first substantially linear portion of the charge curve $b_2$ as the capacitor 41 is charged. At the end of the first half cycle of the signal wave, when the signal voltage $b_2$ shifts from a positive to a negative value, the rate of charge of the capacitor 41 is decreased, accounting for the second substantially linear portion of lesser slope of the charge curve $b_2$.

When voltage $b_2$ of the base 23 of transistor 21 reaches the conduction level, the multivibrator 20 is switched back to the condition with transistor 21 conducting and transistor 22 cut off. The voltage (curve $b_3$) at base 24 of transistor 22 abruptly drops and then rises at the same rates that the voltage on base 23 did during the previous half cycle, but in opposite sequence. The collector 34 and 33 waveforms $b_4$ and $b_5$, as shown, are substantially square waves 180° out of phase and equal in length. The output voltage $b_6$ of the multivibrator 20 is derived from the collector electrode 33 or 34. In this case, with the output lead 50 connected to collector 34, the output wave $b_6$ corresponds to wave $b_5$. The low-pass filter 51 connected to the multibrator 20 in effect integrates the output of the multivibrator 20 and produces a zero D.C. output with some ripples on it as shown in curve $b_7$. The output of multivibrator 20 under conditions of FIG. 4*b* is substantially zero, and zero voltage (waveform $b_7$) is fed back to the base electrodes 23 and 24 through the respective resistors 54 and 55. No frequency-shifting voltage is therefore applied to the voltage control oscillator 20, and it remains at the center or free-running frequency.

FIG. 4*a* shows the operation with a modulating signal $a_1$ of frequency below that of the free-running or center frequency of the multivibrator. The general shape of the base and collector waveforms $a_2$ and $a_3$ are the same as in FIG. 4*b*. However, the rise in voltage of the base electrode 24 of the transistor 22, which is cut off, is changed. In the first half cycle, the incoming voltage remains at the positive maximum level for a greater percentage of the cycle than in the case of modulation at the free-running frequency of the oscillator 20, as in FIG. 4*b*, and the base 24 reaches the switching potential in less than one-half of the oscillator cycle. The situation is reversed in the second half cycle when the modulating wave remains at the negative maximum level for a greater percentage of the oscillator cycle. The average slope of the rising portion of curves $a_3$ and $a_2$ of base 24 and 23 is less than in the center frequency case, due to the negative voltage $a_7$ applied to the charging circuit, and the average time required to reach the switching potential is increased. The average slope of curve $a_3$ is less than curve $a_2$, so the net result is that asymmetrical waveforms $a_6$ and $a_5$ appear on the collectors 33 and 34 of the transistors 21 and 22 with the second excursion being of greater duration than the first excursion. The total time of the full cycle remains the same as the incoming signal period.

When the output (curve $a_6$) of the multivibrator 20 with its asymmetrical waveform is integrated by the low-pass filter 51, the D.C. component present, due to the difference in duration of the two half cycles, appears as a negative voltage which displaces the center line of the waveform $a_7$ below the zero-volt level. The output of the D.C. amplifier 52 is then a negative voltage less than that in the case of modulation at the free-running frequency (FIG. 4*b*).

When an incoming signal $c_1$ of frequency above that of the center or free-running frequency of the multivibrator 20 is applied to the discriminator of FIG. 2, the average charging rate of the capacitor 41, as illustrated in FIG. 4 by the voltage curve $c_2$ of base electrode 23, is reduced while the slope of the similar curve of base electrode 24 is increased. The collector waveforms $c_6$ and $c_5$ again are asymmetrical, with the first excursion being of greater duration than the second excursion. The output of the multivibrator 20, shown as curve $c_6$, includes a positive excursion of greater length than the negative excursion, so that the output contains a D.C. component readily observable in the waveform $c_7$. This D.C. component is at a positive voltage level. When the positive voltage is fed back to the multivibrator, it changes the charging rate of the capacitors 41 and 42 to increase the frequency of the multivibrator 20 to match the incoming signal frequency.

Figures 5, 6:
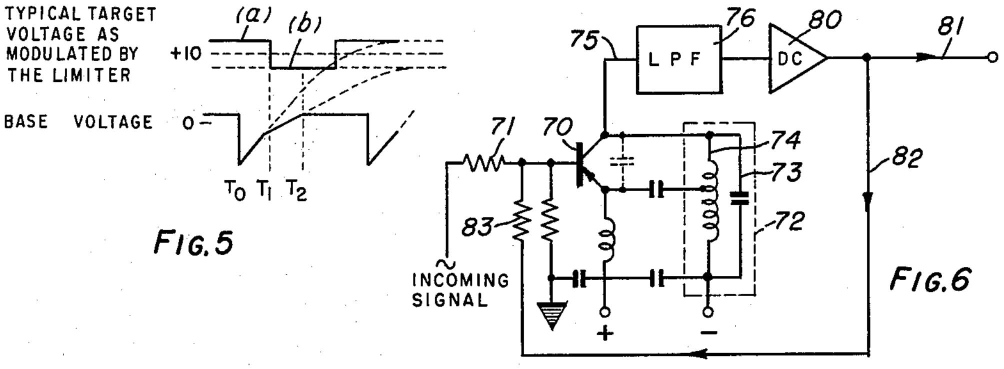
FIG. 5 is a graphical representation of the variation in base voltage of an oscillator employed in this invention with variations in incoming signal voltage.
FIGS. 6 and 7 are electrical schematics of other embodiments of this invention.

The changes in duration of the half cycle of the output waveform of the oscillator, as shown in FIGS. 4*a* and 4*c*, are produced because the target voltage, to wit, the voltage toward which the capacitors 41 and 42 charge, is modulated by the signal voltage. The effect of the target voltage modulation is illustrated in FIG. 5. The waveform of the base electrode 23 of transistor 21 is shown with the negative excursion to cut-off during a positive excursion of the modulating voltage. From the cut-off voltage, the base voltage charges toward the level (*a*) of the target voltage as modulated by the incoming signal. At the end of the positive half cycle of the incoming signal, time $T_1$, when the target voltage changes from a higher to a lower level, the charging rate of the base circuit is reduced as the target voltage has been reduced to the level (*b*). The time between time $T_0$ and $T_2$, at which time switching takes place, is a function of the magnitude of the target voltages as modulated by the incoming signal and the relative duration of the two target voltage levels, i.e., the phase of the signal.

A discriminator in accordance with this invention is particularly designed for operation in the standard telemetering Inter Range Instrumentation Group bands ranging from 400 cycles per second to 70 kilocycles per second with a standard deviation of ±7.5% or ±15%. However, its operation is not limited to such bands. Typical component types and values for a discriminator intended for telemetering use are as follows:

| | |
|---|---|
| Capacitors **41** and **42** | 13.32 $\mu$f.[1]$f_0$. |
| Transistors **21** and **22** | Type 2N703 diffused base transistors. |
| Resistors **54** and **55** | 500KΩ. |
| Resistors **43** and **44** | 250KΩ. |
| Resistors **35** and **36** | 3.25KΩ. |
| Resistor **32** | 0–1KΩ. |
| Resistors **26** and **27** | 100KΩ. |
| Supply **45** | 30 volts. |
| Supply **40** | 5 volts. |

[1] Where $f_0$ is the oscillator center or free-running frequency.

The D.C. amplifier has a required gain which is a function of the required voltage input to the voltage-controlled oscillator to produce the necessary phase shift (and resultant frequency shift). The voltage required at the oscillator is primarily a function of the collector voltage supply.

The same concept hereinabove disclosed can be applied to any oscillator that has an average output frequency proportional to the integral of the input voltage over at least one cycle. Most sinusoidal frequency-modulated oscillators, as well as the multivibrator type described before, fit into this category. FIG. 6 shows a transistorized sine wave oscillator connected in the phase-locked loop configuration of this invention. The circuit includes a transistor 70, to the base of which is applied, through a resistor 71, an incoming sine wave signal. The change in base voltage varies the emitter-collector capacitance which acts as a shunt variable capacitance, indicated by the dashed lines on the drawing, across a portion of a tank circuit 72 made up of a capacitor 73 and an inductance 74, and thereby varies the oscillator frequency. The output of the oscillator is applied through a lead 75 to a low-pass filter 76 to derive the unidirectional voltage component of the output of the oscillator. That voltage is then in turn amplified by the amplifier 80 and constitutes the output signal on lead 81 and the voltage which is fed back through lead 82 and resistor 83 to the base circuit of the transistor 70 to frequency-modulate the oscillator.

Figure 7:
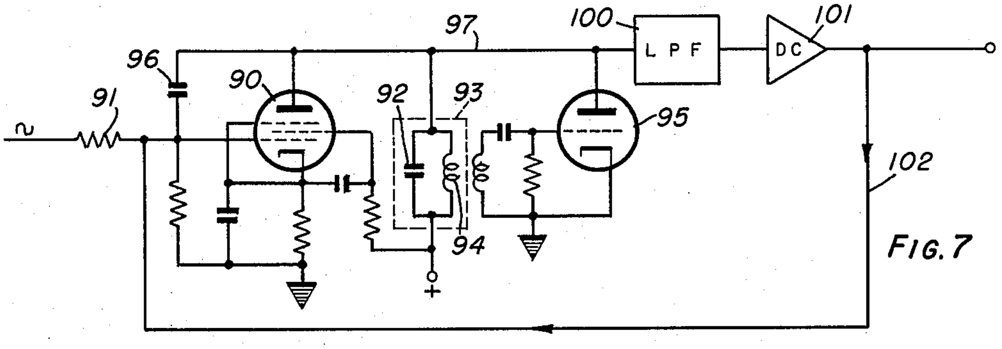

FIG. 7 shows a typical vacuum tube oscillator 95 frequency-modulated by a reactance tube circuit connected in the phase-locked loop configuration of this invention. It employs a conventional reactance tube 90 with an incoming sine wave applied to the control grid through a resistor 91. A grid capacitor 96 causes the grid voltage to lead the plate voltage by approximately 90°'. The magnitude of the plate voltage is a function of the $g_m$ of the tube which varies with the modulating signal. The net effect is equivalent to adding capacitance to tank circuit 93, made up of capacitor 92 and inductor 94. The tank circuit 93 is inductively coupled to the grid circuit of oscillator 95 and thereby tunes the frequency of the oscillator 95 as a function of the instantaneous voltage appearing on the grid of reactance tube 90. The output of the oscillator 95 is in the conventional reactance tube modulator manner, fed back to the control grid of the reactance tube 90 through a conductor 97 and a capacitor 96, and also is applied as the input to a low-pass filter 100 connected to an amplifier 101 in the same manner as the other embodiments of this invention. The output of the amplifier 101 is the low-frequency voltage having a magnitude varying directly with the deviation of the incoming signal from the normal or center frequency of the oscillator 95. This same voltage is applied back through conductor 102 to the input of the reactance tube 90. The level of the modulating voltage applied to the reactance tube 90 is therefore modified as a function of the output voltage from amplifier 101 and serves to drive the oscillator to a frequency which is equal to the frequency of incoming voltage.

Figure 8:
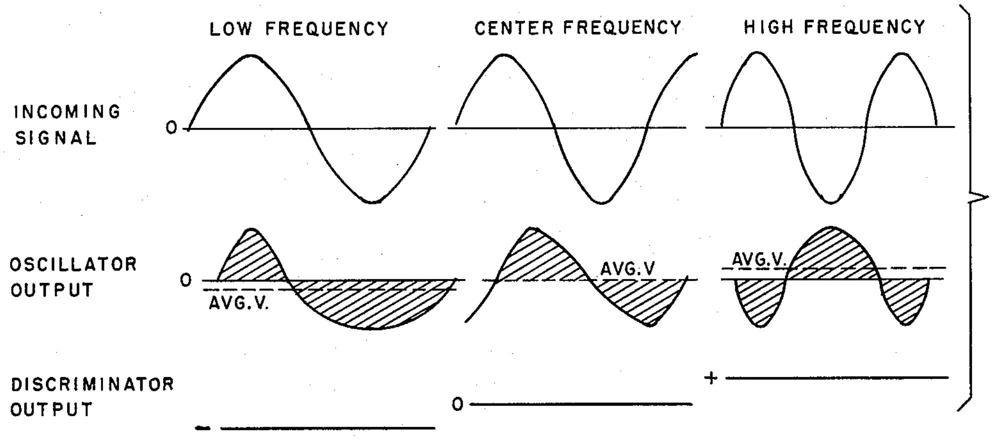
FIG. 8 is a graphical representation of the waveforms obtained from the embodiments of FIGS. 6 and 7.

The operation of the oscillators of FIGS. 6 and 7 is illustrated in FIG. 8, in which the input and output waveforms at different modulating frequencies are shown. First, a low frequency, next, the center frequency and, third, a high frequency case, are shown. It is noted that the output waveforms are distorted, and none appear to be classifiable as sine waves. In the case of the modulation of the oscillator with a low frequency, the output wave is asymmetrical, and the integrated value or area of the negative voltage excursion is greater than that of the positive excursion. In the case of modulation at the center frequency, the output waveform is largely of a triangular shape but having the positive and negative excursion of equal magnitude and area. In the case of modulation at a frequency higher than the center frequency, a waveform of the same general shape as in the case of a low-frequency modulation, only inverted, is generated. The area of the positive excursion exceeds that of the adjacent negative excursion. The integrated D.C. value of the curves in each of the three cases over a single cycle in the case of the low-frequency modulation produces a negative voltage output, in the case of the center frequency produces zero voltage output, and in the case of high-frequency modulation produces a positive voltage output. These voltages, when fed back in the proper polarity and relative magnitude, serve to drive the oscillator to the modulating frequencies.

It may therefore be seen that a simple tracking filter or discriminator for frequency-modulated systems may be had without the use of a phase comparator and separate voltage-controlled oscillators, and still achieve the advantages of the phase-locked loop discriminator. Whether the oscillator is of the sine wave configuration or of the multivibrator type, the modulating signal may be applied directly to the input electrode or electrodes and is superimposed upon a unidirectional input voltage. The unidirectional voltage is derived from the output of the oscillator and is used to vary the frequency of the oscillator.

This simplification of the phase-locked loop discriminator results in reduced costs in size and reliability as well, by the elimination of the separate phase comparator.

Although for the purpose of explaining the invention a particular embodiment thereof has been shown and described, obvious modifications will occur to a person skilled in the art, and I do not desire to be limited to the exact details shown and described.

I claim:

1. A free running multivibrator comprising:

a pair of amplifying devices each having an input and an output with the output of each connected by a capacitor to the input of the other, and resistive biasing circuits connected to said inputs, such that said multivibrator normally oscillates at a median frequency determined by the time constant of said capacitors and resistances of said biasing circuits to produce an alternating output potential having positive and negative half cycles of equal duration;

means for applying to the inputs of both amplifying devices an A.C. signal to be frequency compared with said median frequency such that frequency differences between said median frequency and said A.C. signal are reflected in said output potential as positive and negative half cycles of unequal duration;

means connected to said multivibrator for filtering said output potential to produce a unidirectional potential of polarity and magnitude corresponding to the difference between the durations of said positive and negative half cycles;

means for applying said unidirectional potential to the inputs of both said amplifying devices; and means for indicating the polarity and magnitude of said unidirectional potential.

2. A frequency discriminating apparatus comprising:

a free running multivibrator having a pair of amplifying devices each having input and output terminals, means including one capacitor connecting the output terminal of one amplifying device to the input terminal of the other, means including a second capacitor connecting the output terminal of said other device to the input terminal of said one device, a pair of biasing circuits, one for each of said input terminals, each circuit comprising a source of potential and resistance means connecting said source to its associated input terminal, for alternately charging said capacitors at equal time rates and causing said multivibrator to produce an alternating output potential having positive and negative half cycles of equal duration at a predetermined median frequency;

means for superimposing on the biasing potentials applied to said input terminals an A.C. input signal to be frequency compared with said median frequency such that frequency differences between said median frequency and said A.C. signal are reflected in said output potential as positive and negative half cycles of unequal duration.

means for filtering said output potential to produce an output signal of polarity and magnitude determined by the relative durations of said positive and negative half cycles;

means for amplifying said output signal; and means for superimposing said amplified output signal on the said biasing potentials and said input signals applied to said input terminals in direction to shift the frequency of said output potential toward the frequency of said input signal;

said amplifying means having sufficient gain to synchronize said output potential frequency with said input signal frequency over a substantial range of frequencies above and below said median frequency, with a phase shift proportional to the departure from said median frequency.

References Cited by the Examiner

UNITED STATES PATENTS

| | | | |
|---|---|---|---|
| 2,461,871 | 2/1949 | Bass | 331—17 |
| 2,491,922 | 12/1949 | Hepp | 331—1 |
| 2,912,637 | 11/1959 | Barnes et al. | 331—113 |
| 2,922,118 | 1/1960 | Albright | 331—1 |
| 3,013,220 | 12/1961 | Norris | 332—14 X |
| 3,046,496 | 7/1962 | Trevor | 331—17 X |
| 3,084,327 | 4/1963 | Cutler | 325—346 X |

OTHER REFERENCES

Cornell, Radio and Television News, "A Single Tube AFC Circuit for TV Deflection Systems," January 1950, pages 58–60 and 144–145.

"Negative Feedback Applied to Oscillators," Electronics Magazine, May 1940, pages 32–33–TK7800.E58.

ROY LAKE, *Primary Examiner.*

L. MILLER ANDRUS, ALFRED L. BRODY, *Examiners.*